(12) United States Patent
Filippou et al.

(10) Patent No.: US 11,540,082 B2
(45) Date of Patent: Dec. 27, 2022

(54) PROCESSING SYSTEM, UPDATE SERVER AND METHOD FOR UPDATING A PROCESSING SYSTEM

(71) Applicant: Intel Corporation, Santa Clara, CA (US)

(72) Inventors: Miltiadis Filippou, Munich (DE); Michael Faerber, Wolfratshausen (DE); Ingolf Karls, Feldkirchen (DE); Leonardo Gomes Baltar, Munich (DE); Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 16/145,200

(22) Filed: Sep. 28, 2018

(65) Prior Publication Data
US 2019/0053000 A1 Feb. 14, 2019

(51) Int. Cl.
*H04W 4/021* (2018.01)
*H04B 17/336* (2015.01)
*H04W 72/04* (2009.01)
*H04W 4/40* (2018.01)
*G08G 1/00* (2006.01)
*G06F 8/00* (2018.01)
*H04L 67/00* (2022.01)
(Continued)

(52) U.S. Cl.
CPC ............. *H04W 4/021* (2013.01); *G06F 8/00* (2013.01); *G08G 1/00* (2013.01); *H04B 17/336* (2015.01); *H04L 67/34* (2013.01); *H04W 4/40* (2018.02); *H04W 4/44* (2018.02); *H04W 4/50* (2018.02); *H04W 72/0453* (2013.01); *H04L 67/12* (2013.01)

(58) Field of Classification Search
CPC ... G06F 8/00; G06F 8/654; G06F 8/76; H04B 17/336; H04L 67/12; H04L 67/34; H04W 4/021; H04W 72/0453
USPC ........................................................ 370/329
See application file for complete search history.

(56) References Cited

U.S. PATENT DOCUMENTS

2017/0046236 A1* 2/2017 Borkenhagen ...... G06F 11/2046
2018/0302770 A1* 10/2018 Bhaskaran ............. H04W 4/40

OTHER PUBLICATIONS

K<Lobedanz, K. et al., "Distributed coordination of task migration for fault-tolerant FlexRay networks", International Symposium on Industrial Embedded System (SIES), 2010, 9 pages, IEEE, Piscataway, NJ, USA.

(Continued)

*Primary Examiner* — Omar J Ghowrwal
*Assistant Examiner* — Kokou R Detse
(74) *Attorney, Agent, or Firm* — Viering, Jentschura & Partner mbB

(57) ABSTRACT

According to various examples, a processing system is described comprising a plurality of hardware circuit components, each hardware circuit component configured to provide a processing functionality, a data path leading through the plurality of hardware circuit components, at least one programmable circuit and a controller configured to select one of the hardware circuit components to be replaced by the at least one programmable circuit, program the programmable circuit to provide the processing functionality provided by the selected hardware circuit component and configure the data path to lead through the programmable circuit instead of the selected hardware circuit component.

20 Claims, 8 Drawing Sheets

(51) Int. Cl.
H04W 4/50 (2018.01)
H04W 4/44 (2018.01)
H04L 67/12 (2022.01)

(56) References Cited

OTHER PUBLICATIONS

European search report issued for the corresponding EP application No. 19 182 746.8, dated Jan. 7, 2020, 10 pages (for informational purposes only).

Azizian et al., "Vehicle Software Updates Distribution with SDN and Cloud Computing", IEEE Communications Magazine, Aug. 2017, pp. 74-79, vol. 55, Issue: 8.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14)", V14.4.0 (Oct. 2017), 329 pages.

Steger et al., "Applicability of IEEE 802.11s for Automotive Wireless Software Updates", Telecommunications (ConTEL), 2015 13th International Conference on. IEEE, 2015, 8 pages.

Steger et al., "Generic framework enabling secure and efficient automotive wireless SW updates," 2016 IEEE 21st International Conference on Emerging Technologies and Factory Automation (ETFA), Berlin, 2016, 8 pages.

Andrade et al., "Connected cars in cellular network: a measurement study", Proceedings of the 2017 Internet Measurement Conference ACM, 2017, 7 pages.

Andrade et al., "Managing Massive Firmware-Over-The-Air Updates for Connected Cars in Cellular Networks", CarSys, Oct. 2017, Snowbird/UT, USA, 8 pages.

Höyhtyä et al., "Integrated satellite-terrestrial systems: Use cases for road safety and autonomous ships", Proceedings of the 23rd Ka and Broadband Communications Conference, 2017, Trieste, Italy, 9 pages.

http://interactive.satellitetoday.com/via/november-december-2017/the-connected-car-and-where-satellite-fits-in/, Dec. 2017, downloaded Sep. 24, 2018, 12 pages.

http://insideunmannedsystems.com/evolution-satellite-firms-adapt-serve-drones-connected-cars/, downloaded Sep. 24, 2018, 6 pages.

* cited by examiner

PROCESSING SYSTEM, UPDATE SERVER AND METHOD FOR UPDATING A PROCESSING SYSTEM

TECHNICAL FIELD

Exemplary implementations described herein generally relate to processing systems, update servers and methods for updating a processing system.

BACKGROUND

While smartphones are typically replaced after few years, an electronic circuit installed in a vehicle has a much larger lifetime due to vehicles being in operation much longer. Accordingly, there is a need to keep electronic components in vehicles up-to-date over long periods. This is especially true for communication devices (i.e. mobile terminals) which are installed in vehicles in increasing numbers, in particular to support V2X (of Vehicle-to-Anything) communication, since communication standards typically evolve quickly and without updates, vehicles would be equipped with obsolete communication devices soon after their sale. Accordingly, efficient ways to update electronic circuits of processing systems, in particular of processing systems installed in vehicles including communication devices as well as for example control circuits, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION OF EXEMPLARY IMPLEMENTATIONS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
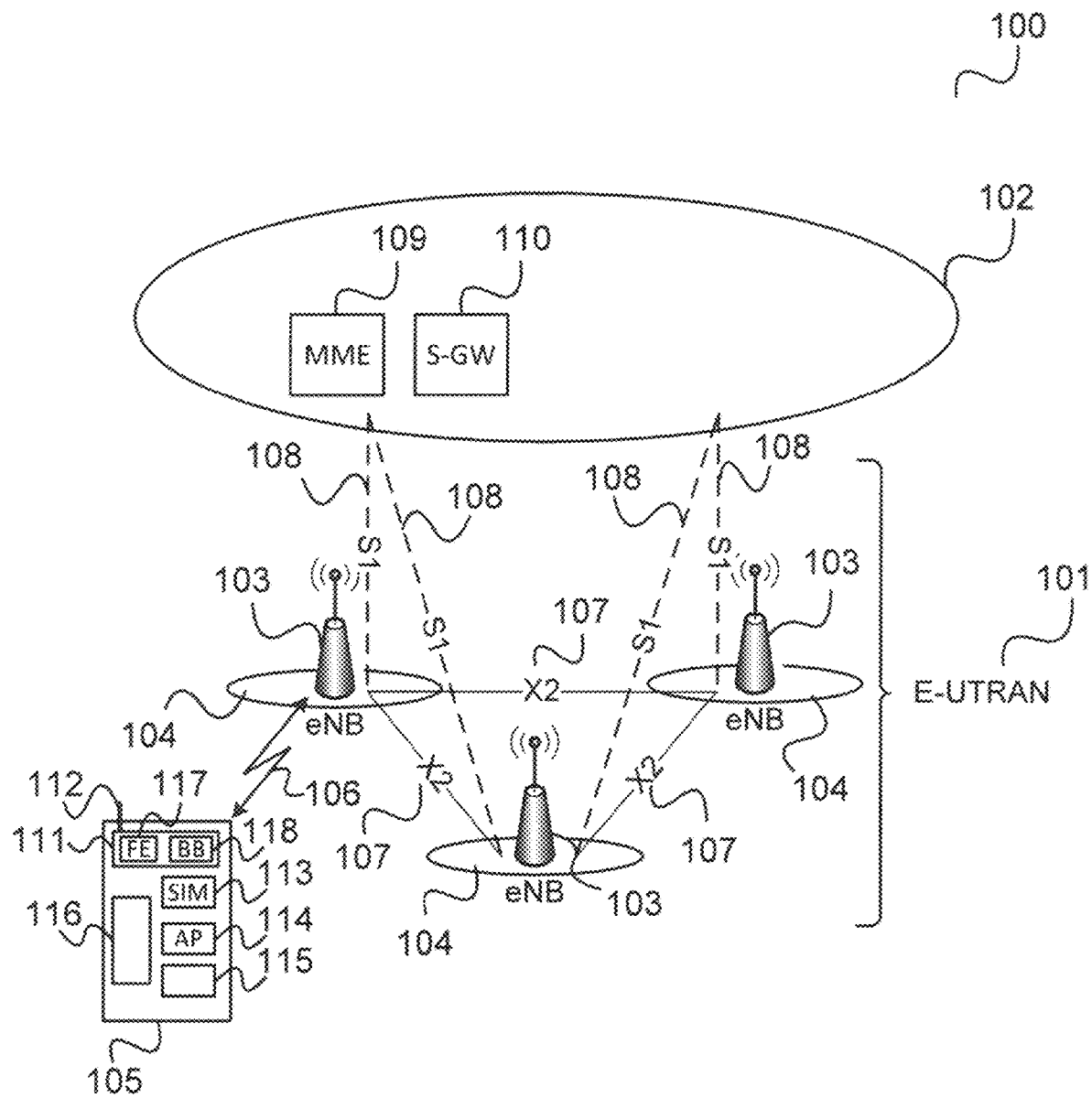
FIG. 1 shows a mobile radio communication system.

FIG. 1 shows a mobile radio communication system.

The communication system 100 includes a radio access network (e.g. an E-UTRAN, Evolved UMTS (Universal Mobile Communications System) Terrestrial Radio Access Network according to LTE) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101.

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell. In certain scenarios, for example in case of Vehicle-to-Anything Anything (V2X) communication, the mobile terminal (UE) 105 may also directly communicate with another mobile terminal, possibly attached to a different PLMN, i.e. while bypassing the base stations 103. This direct communication may take place over a common radio resource (spectrum, frequency, time unit) equally accessible to both network operators. According to various examples as described below, the arbitration of this radio resource is addressed. In a given time window each unit of this radio resource could be claimed by any of the participating PLMNs and allocated to UEs attached to it.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109 and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network 102 may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) or 5G (Fifth Generation) radio access. Accordingly, the radio access network 102 may operate as an E-UTRAN, a UTRAN, a GSM radio access network, a GERAN (GSM EDGE Radio Access Network) or a 5G radio access network. Analogously, the core network 102 may include the functionality of an EPC, a UMTS core network, a GSM core network or a 5G core network.

For radio communication via the air interface 106, the mobile terminal 105 includes a communication subsystem 111 and one or more antennas 112 and one or more multiple subscriber identity modules 113. The mobile terminal 105 also includes a processor 114 as well as a main memory 115 for running programs. The mobile terminal 105 may further include a battery 116 for power supply. It may also be connected to a battery for power supply, e.g. in case it is installed in a vehicle. The communication subsystem 111 may include a radio frequency transceiver (e.g. including a radio frontend) 117 and a baseband processor 118.

According to various embodiments, the mobile terminal 105 is a vehicle UE, i.e. a mobile terminal (or user equipment according to LTE) that is part of a vehicle. This means that the vehicle has its own subscription (and e.g. its own SIM 113). Such a scenario is the basis of Vehicle-to-everything (V2X) communication which involves the passing of information from a vehicle to any entity that may affect the vehicle (e.g. another vehicle), and vice versa.

3GPP has introduced LTE based V2X services in Release 14. Direct UE to UE communication V2X services are currently defined on dedicated ITS band (5.9 GHz). The typical deployment would be a 10 or 20 MHz carrier on this frequency band designated as Band 47 (B47). The UEs (communication devices installed in vehicles or RSUs (road side units)) are configured to use radio interface resources (physical resource blocks per sub-frame) in this carrier for communication using LTE sidelink channel communication (also referred to as PC5 interface which is the interface used for device-to-device direct communication). Two types of resource usage are standardized. In one (autonomous mode or mode 4), the UEs select resources autonomously. In the second method (eNodeB controlled mode or mode 3), the resources are assigned by the eNBs (LTE Radio Access Nodes) that the UE is currently communicating with.

It should be noted that LTE is used herein only as an example for a mobile radio communication technology that may be used by a communication device or communication terminal: any of the mobile radio communication or radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety re-lated applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies).

Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note:

allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. I.e., some or all features defined for network equipment may be implemented by a UE.

Figure 2:
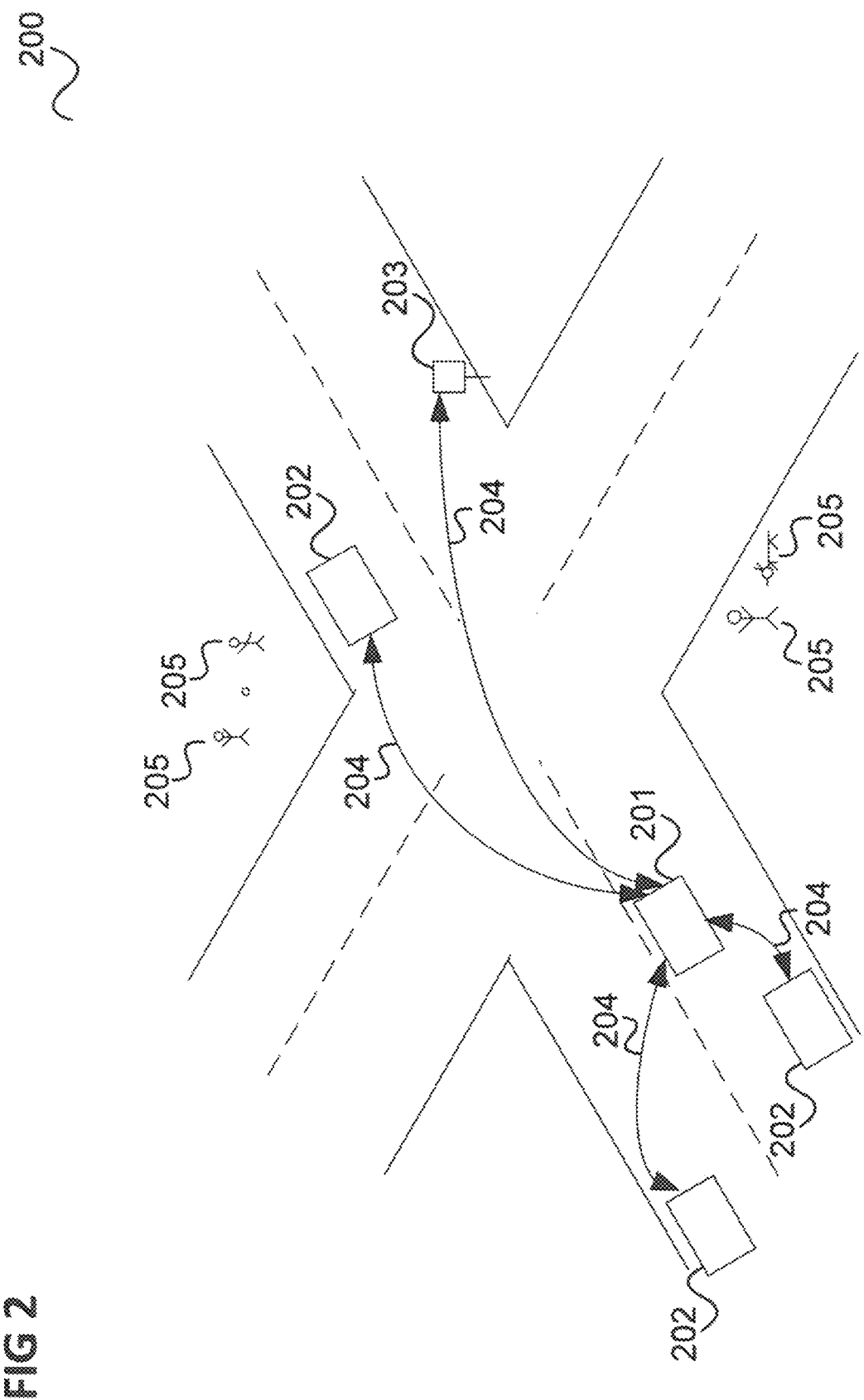
FIG. 2 shows a V2X (Vehicle-to-Everything) communication system.

FIG. 2 shows a V2X (Vehicle-to-Everything) communication system 200.

In the communication environment of a V2X communication system 200, a first vehicle 201 exchanges messages with second vehicles 202 as well as Road-Side Units (RSUs) 203, as illustrated by arrows 204. The messages are exchanged wirelessly by radio communication, e.g. by means of a cellular communication network, e.g. a 5G communication network.

Similarly, the second vehicles 202 may communicate among themselves and the RSUs 203 such that altogether, the devices 201, 202, 203 have a collective perception/cognition which can be defined as a state where different devices are able to share different views of the traffic environment within a specific coverage area.

The V2X system 200 may have various control entities which take decisions based on information about the traffic environment. For example, a controller in vehicle 201 performs control actions (e.g. automated breaking) or output of alarm signals to its driver based on the information about the traffic environment. As another example, there may be a controller for traffic lights operating based on the information about the traffic environment.

The communicating vehicles 201, 202, 203 may each be provided with a communication terminal 105 as described with reference to FIG. 1. In particular, they may communicate via base stations 103. However, according to various embodiments, the vehicles 201, 202, 203 use direct communication for communicating, e.g. bypassing a network-side communication architecture (e.g. bypassing base stations, access points or similar network-side communication architecture components).

A communication terminal or another processing device of a processing system in a vehicle, such as a control device for controlling any operation of the vehicle (such as an Electronic Control Unit (ECU)), may comprise and operate according to a firmware.

The firmware (firmware) in a vehicle device (i.e. a processing device installed in a vehicle) typically requires regular updates to address bugs, security vulnerabilities or enhance the vehicle's capabilities. Given the critical role of software (software) and the enhanced levels of regulation on safety recalls for vehicles and other devices, users (e.g. stakeholders) are looking for ways of achieving timely, reliable, and effective firmware updates, beyond the existent approaches. An approach is to update by means of Firmware Over-The-Air (FOTA) or analogously SOTA (Software Over-The-Air). These firmware (or software) updates range from tens of Megabytes to Gigabytes and are transferred via Wi-Fi, DSRC or cellular network wireless links.

Cellular network systems like 3GPP LTE, or the New Radio (NR) (also known as 5G, currently specified by 3GPP), are also intended for use in vertical segments. One of these segments is the automotive segment, and NR is an element for the Vehicle-to-everything (V2X), communication especially the Vehicle-to-Vehicle (V2V) and the Vehicle-to-Network (V2N) connectivity.

There is a need to establish V2N connectivity when it comes to specifics of FOTA. Firmware Over-The-Air (FOTA) updates are one of the major purposes of V2N connections. FOTA downloads are related to a variety of vehicular applications (e.g., referring to on-board map data, cruise control, engine management, infotainment), and, as a result, they have different requirements in terms of urgency and functional safety. For example, some applications are designed to improve convenience and safety, e.g., map updates containing temporary road blockages and construction sites, while, other software updates are destined to affect the vehicle operation as such, e.g., an update for one of the Electronic Control Units (ECUs) of a vehicle. Focusing on FOTA, such updates should typically be done as quickly as possible when a vehicle is in operation/motion and while the vehicle is under coverage or even enhanced coverage of a radio connection. Therefore, approaches for efficiently prioritizing and delivering FOTA updates for vehicles are desirable.

FOTA updates may be launched at off-peak times, or pre-fetching and caching of data either may be performed opportunistically or based upon schedulers to balance completion of updates in an allotted time without sacrificing the median download startup delay and network load, while keeping the number of vehicles that do not complete FOTA updates as low as possible. From a purely physical layer viewpoint, receiver parameters may be adapted to the environmental conditions, such as SINR, shadowing, etc. However, a simple adaptation of signal reception schemes is typically not sufficient to achieve and sustain an improved ratio of decoding efficiency over power consumption or over reception processing complexity. By observing current standardization activities, the concept of enhanced coverage, as defined in 3GPP would be proven useful, with the aim of expanding the opportunities in space and in time for FOTA updates on-board a vehicle. However, this is done for the provision of only basic services as data throughput cannot support demanding software updates when a vehicle is under enhanced coverage.

An approach based on a wireless update system based on the IEEE 802.11s mesh standard may be used for increasing the efficiency of SOTA which uses a multi-hop approach for range extension. However, this may only be applicable to static/semi-static use cases of short range or indoor communications, e.g., during workshops or for diagnostics purposes.

Furthermore, it has been observed that vehicles exhibit diurnal patterns, similar to smartphones and connections are quite short in time, on average, similar to Internet-of-Things (IoT) data transfer sessions. These, along with other behavioral patterns call for intelligent management of data transfers. To address such a need, inspired by the results of the measurement campaign, data analytics may be exploited, with the aim of improving the performance of massive FOTA update sessions in terms of the achieved update completion time, among other metrics. The designed task scheduler takes into account historical data and schedules the sessions towards achieving a performance goal, however this approach only focuses on legacy cellular networks (e.g., 3GPP LTE) and discards other Radio Access Technologies (RATs) that can be exploited, depending on the characteristics of the data transfer and the radio link conditions when e.g. FOTA is about to be carried out. On the contrary, an integrated satellite-terrestrial system for road safety enhancement and autonomous shipping may be used where the usefulness of multiple RATs and Multi-Access Edge Computing (MEC) infrastructure is justified, however, the focus is far from the problem of efficiently adapting SOTA/FOTA updates to radio link quality. The usefulness of satellite communications to alleviate the problem of non-full radio coverage for vehicles has also attracted attention from the car industry.

When it comes to exploiting technologies such as Software Defined Networking (SDN) for vehicular data transfer purposes, software updates may be distributed among vehicles by means of dedicated short-range communications (DSRC) connectivity, assisted by SDN and cloud computing. In more detail, vehicular networks may be modeled as connectivity graphs, which, in turn, constitute input for the SDN architecture. Then, SDN-based bandwidth allocation over the graph edges can take place for performance improvement. Although technologies related to edge computing (e.g., OpenFlow) may be exploited towards optimal software update downloading, a "platoon" of cars is essential for the applicability of the scheme, which may not be always existent, and, on top of that, security issues may be raised. Also the above is based on the assumption that all vehicles exchanging parts of the software update file are in need of the same release of the same software/firmware package, which may not always occur in practice.

In summary, conventional approaches are often based on a single "one fits all" configuration, i.e. do not consider optimization of the SOTA/FOTA update, depending on locally applicable conditions and needs for V2X communications. A single "one fits all" configuration is often suboptimum in a specific, locally applicable context. The overall performance of the system is thus often not satisfactory.

Further, conventional approaches typically focus on either functional safety issues like security & authentication for SOTA/FOTA updates on vehicles, or, on legacy network infrastructure.

According to various examples, instead, SOTA/FOTA updates on vehicles are scheduled depending on a set of criteria, such as the quality of the cellular link, the criticality of the update, the release of the software suite, the size of the downloadable file, as well as the location and the mobility status of the vehicle. In other words, since a simple parameterization based on the environmental information is typically sub-optimum, an adaptive SOTA/FOTA update scheme is used according to various examples which accounts for a number of features as the ones above (quality of cellular link etc.) in order to find the best trade-off between update efficiency and resource availability.

According to various examples, to address the negative impact of wireless link variations during SOTA/FOTA updates, these updates for vehicles are managed at a massive scale over a cellular network taking V2X specifics into account. This approach targets challenges like the large number of vehicles, the need to perform updates quickly and securely, the ability to perform the update anywhere and anytime, and delivering the often large updates without affecting other network users. For example, it may be taken into account that vehicles operate in various environments under very diverse wireless link conditions measured as SINR, shadowing, channel fast fading, etc. According to various examples, depending on the environment, and with the aim of efficiently managing SOTA/FOTA updates, transmission/reception profiles are adapted to optimize a performance metric such as the ratio of decoding efficiency over power consumption or over reception processing complexity. For example, at high SINR regimes, complex channel decoding can be skipped; instead, a simple identification of the original message would be sufficient.

Thus, according to various examples, approaches are provided to improve the efficiency of Software/Firmware Over-The-Air (SOTA/FOTA) updates for V2X applications through communications optimized for the locally applicable requirements, based on environmental context information as well as approaches for prioritizing and managing control units' SOTA/FOTA updates.

For example, depending on the locally applicable conditions and requirements, a tailored SOTA/FOTA using V2X communication is provided to update processing devices such as communication devices or Electronic Control Units (ECUs) of vehicles. These updates may replace only specific sub-components (such as channel decoding on an Onboard Unit (OBU), or an actuator control algorithm on a Powertrain Control Module (PCM), etc.) or the entire firmware, depending on the need.

According to various examples, a system is provided comprising a data base with specific extension data sets holding the data of vehicles intending to receive a SOTA/FOTA update. For each vehicle, the specific data set contains additional data on i) the vehicle's (e.g. OBU) capabilities, including the supported communication protocol(s) (i.e., C-V2X, or DSRC-based or both), ii) whether the coverage extension feature is supported, iii) what the latest link quality status was and at which point in time, and iv) what the latest version of the installed software/firmware suite is.

For a given operational wireless link parameter (i.e., for the same processing block such as channel decoding, etc.), different components of the SOTA/FOTA update package may be optimized for a range of values of link-relevant metrics, e.g. SINR=(from X) . . . (to Y), etc. By jointly taking into account all processing blocks and the data base content, best-suited and updated software/firmware package components are delivered to each vehicle.

Focusing on scenarios of high vehicular densities, according to various embodiments, vehicles are clustered jointly based on: i) the software/firmware suite version, ii) their location, as well as iii) their experienced link qualities, mapped to and accessible via the data base, in order to perform efficient delivery of SOTA/FOTA updates. Possible direct communication capabilities of vehicles belonging to the same 'software/firmware package cluster' can be exploited to share SOTA/FOTA updates of mutual interest.

Following an adaptive SOTA/FOTA update scheme (or framework) as provided according to various examples allows optimally configuring vehicle devices (such as a communication device (e.g. communication module) or ECU) to the locally applicable conditions and requirements. End consumers (e.g., vehicle drivers) can be expected to benefit from this as it enhances the 'real-time' nature of SOTA/FOTA updates, especially when these updates are safety-critical or relevant to driving convenience. Additionally, the SOTA/FOTA update scheme is not constrained by the OBU capabilities of a given vehicle but, contrarily, it adapts to these capabilities. The reason is that the use of the best suited software component for processing under given environmental (link-relevant) conditions, such as SINR, etc., best addresses the trade-off between SOTA/FOTA delivery efficiency and power consumption/processing complexity.

Figure 3:
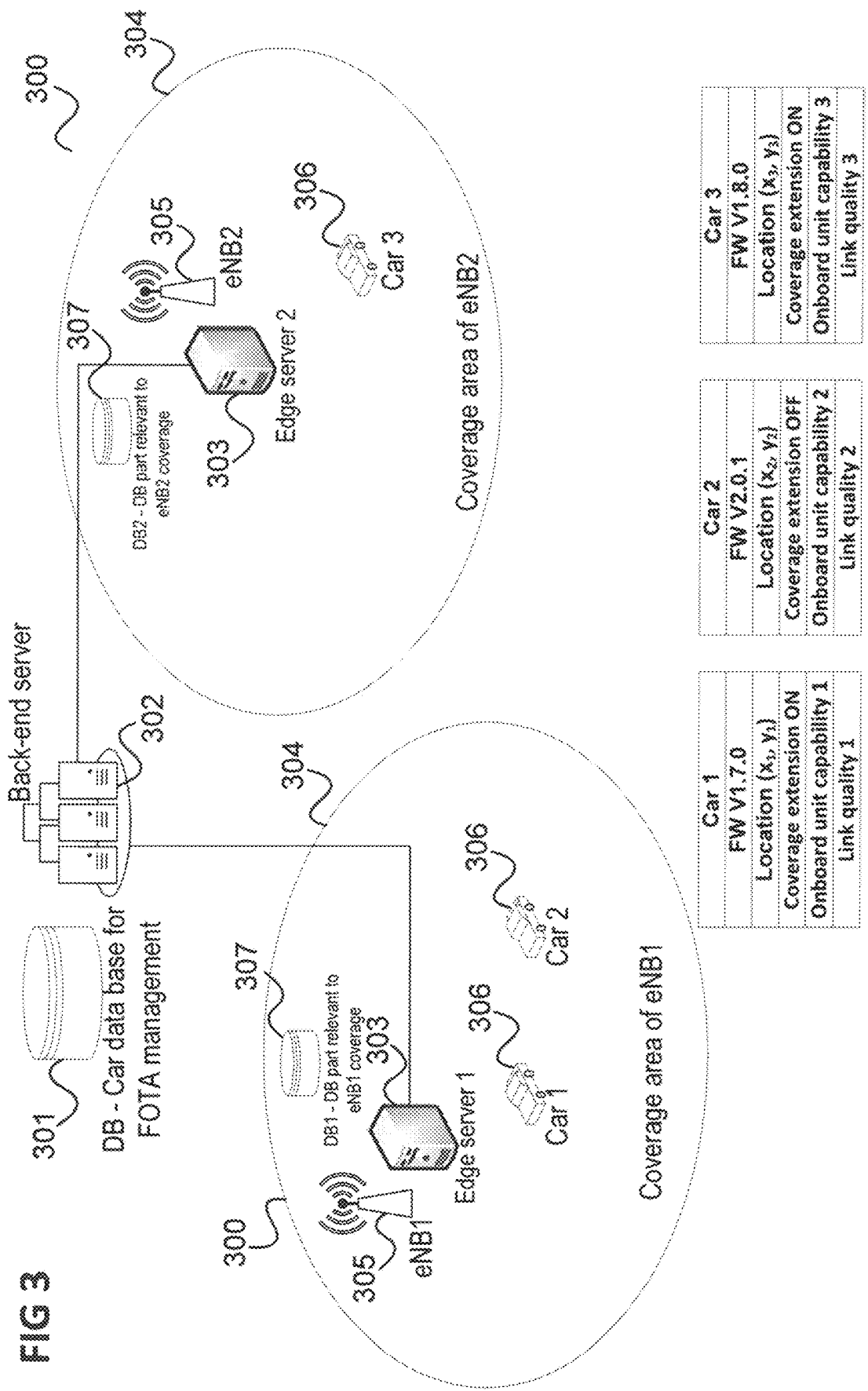
FIG. 3 shows a communication arrangement according to an illustrative example of update management.

FIG. 3 shows a communication arrangement 300 according to an illustrative example of SOTA/FOTA update management assisted by introducing a car data base 301 maintained at a back-end server 302.

To manage the software update of a vehicle device such as a vehicle engine control unit, the database 301 is maintained with specific extensions at the network side, to hold the actual software version of individual vehicles, among other information referring to the vehicles' OBU capabilities, locations and channel conditions, and to flag the need for an update if and when needed.

As shown in FIG. 3, this database 301 can be located at the backend server 302, and parts of it may be copied to edge servers 303, based on location data. The edge servers 303 are located in coverage areas 304, each being operated by a respective base station 305 (as described with reference to FIG. 1). Vehicles 306 are located in the coverage areas 304.

For example, parts of the data base 301 including the specific extended data sets and adapted to locations within the coverage areas 304 of the base stations 305 are copied to the corresponding edge servers 303 for increasing efficiency of possible updates. The edge servers 303 may thus maintain local data bases 307 for storing the data copied to them from the central data base 301.

In the following, some examples and further possible features of data base contents and extensions and their usefulness towards efficiently delivering SOTA/FOTA updates are described.

It should be noted that in the following, an example is described where an edge server 303 of a coverage area 304 in which a vehicle 306 is located decides whether and how to perform a software update of a device of the vehicle 306, i.e. acts as the update controlling entity (i.e. update controller or update control circuit). However, such as decision may also be performed by a central entity (e.g. one associated with the data base 301, e.g. the back-end sever 302) or may also be initiated by a device of the vehicle 306 itself (e.g. by a corresponding request to the network, e.g. to an edge server 303).

As a first example, when a vehicle (e.g. a car) 306 is in the operational state "parked", this means its engine is not in use, no mobility is identified, and the edge server 303 can, by means of its data base 307, accurately determine a location-relevant radio link quality for the vehicle 306. A first criterion for launching a SOTA/FOTA update may for example be whether the onboard telecommunications unit features coverage extension, and if yes, whether the parked car is connected to the network by using this feature. If this is the case, the edge server 303 postpones a software update for the vehicle 306, because the coverage extension is achieved through a strong limitation of the achievable link throughput, either through bandwidth reduction, or extreme high data repetition (an excessive, power wasting number of re-transmissions).

Vehicles 306 of the same (i.e., "parked") mode may be flagged out by the edge server 303 for alternative software updates to be possibly performed later in time. The same decision may be taken by the edge server 303 for vehicles not featuring coverage extension, but experiencing poor radio link quality (e.g., due to frequent deep fading events) and, therefore, unable to support a reliable and efficient SOTA/FOTA update. The radio link is for example the vehicle's radio link to the respective base station 305 via which the edge server 303 intends to transmit the update data, i.e. provides the V2N link for the software update. The V2N link can in this scenario be seen as the connection between the vehicle 306 and the edge server 303 (or any other update controlling entity). A radio link being reliable for example means that the radio link is likely to achieve a sufficiently low block error rate, as compared to a given threshold, which leads to a minimum number of needed re-transmissions. This threshold is for example not fixed but may depend on the size of the software package update to be transmitted together with other factors such as its urgency. This may result to higher likelihood of the edge server 303 allowing/attempting updates of short data volumes (and, possibly higher urgency) under certain radio link conditions, and, accordingly, to a higher likelihood of postponing SOTA/FOTA updates of larger size (and, possibly, lower urgency).

If the time stamp of the radio link information is outdated (e.g., when a timer goes off), the edge server 303 (or also the back-end server 302) can initiate a paging of the vehicle 306 via an Application Interface (API), to get, in response, an almost real-time radio link quality measurement.

Further, the data base 301 (and its local part 307) may keep record of each vehicle's mobility modes and related link quality information. If the link quality conditions (with or without coverage extension) keep causing postponing the SOTA/FOTA update longer then a defined time interval and the car engine control unit is able to store at least two versions of the software package, the edge server 303 can initiate an alternative software update download path. Focusing on this alternative, the user of the vehicle 306 can, for example, register a smartphone for the car software update service, and install an application to support this function. In this case, the software update is downloaded to the smartphone, and if the smartphone connects to the vehicle 306 via a dock, cable, Bluetooth, Wi-Fi, or other means, the edge server 303 conveys the SOTA/FOTA update to a vehicle memory, e.g. a vehicle engine control unit storage, where it is saved. If the vehicle enters into the parking modus, the device for which the update is intended is provided with the update data. For example, an engine control unit switches to the new version, and runs a self-test. If the self-test is successful, the updated packages is set in use, whereas the older version is retained as backup.

In an example as the above where a device (e.g. the car's engine control unit) is able to store at least two software versions (e.g. an old version and a new version), a download via the V2N link can take place whilst the car is in use, i.e. in "mobility" mode. The SOTA/FOTA update can be performed via the radio link, and stored in the vehicle's memory (e.g. the car's engine control unit), but remains inactive, until the car switches to the parking mode. This event will then initiate a self-test, and if successful, a switch to the new software version can take place.

Another example provides a side-link connection to another vehicle 306 or to a roadside unit (RSU) for receiving update data via the other vehicle or the RSU in case the other vehicle or the RSU have a better V2N link quality and are possibly in need of the same software/firmware update. This alternative, which can be used to exploit high vehicle densities, is described in more detail further below.

According to various examples, a software update is used to configure a programmable circuit of a device to replace a hardware component of the device. Typically, hardware components are being used in a first generation implementation of a device. A replacement of a hardware component may be provided by means of a software update as illustrated in FIG. 4.

Figure 4:
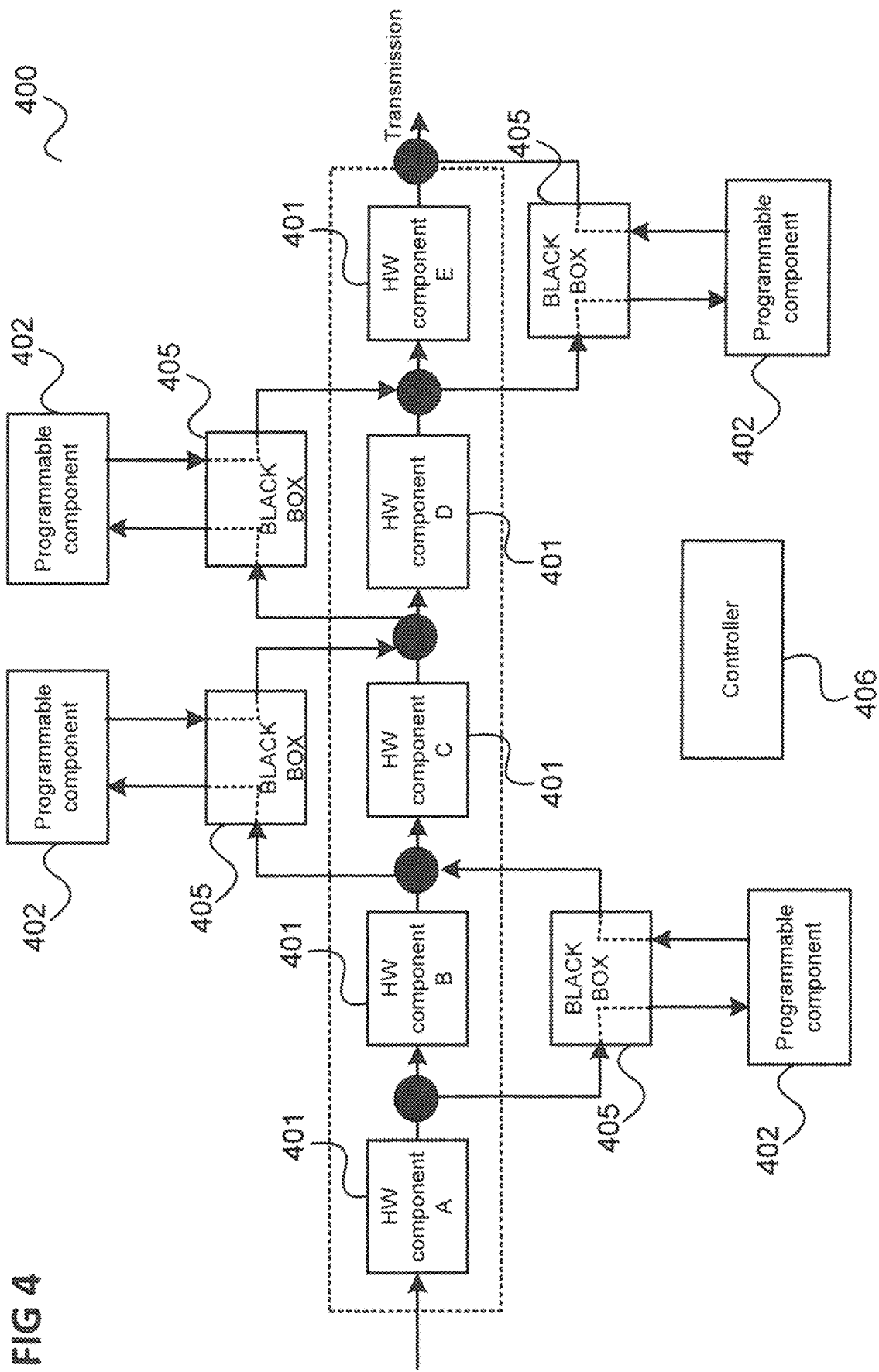
FIG. 4 shows an architecture of a processing system.

FIG. 4 shows an architecture of a processing system 400.

The processing system 400 is for example an OBU. It comprises a plurality of hardware processing components (hardware processing blocks, also referred to as hardware circuit components or hardware components) 401 and a plurality of programmable circuits 402. The programmable circuits 402 are for example FPGAs (Field Programmable Gate Arrays).

The processing system's processing blocks 401, 402 may be reconfigured based on wireless link conditions and different software/firmware package components may be tailored to the various blocks.

In this example, hardware blocks 401 (namely those numbered B to E) may be replaced by the programmable circuits 402. This can be seen as replacing the hardware blocks 401 by software. For replacing a hardware component 401 by a programmable circuit 402, a corresponding controller 406 (which may be part of the processing system 400) programs the programmable circuit 402 accordingly and changes a data path 403, which originally leads through the hardware component 401, to bypass the hardware component 401. This is illustrated by junctions 404 where the original data path 401 may be left to lead through a black box 405 (whose functionality is provided by the corresponding programmable circuit 402) to circumvent the hardware component 401 following the junction 404 such that it is replaced by the corresponding programmable circuit 402. After the programmable circuit 402 the data path may return to the original data path 401 by means of the junction after the hardware component 401 (where the original data path may be left again if the subsequent hardware component 401 is also to be replaced by a programmable circuit 402).

Thus, the black box SFBs (System Function Blocks) 405 replace the original hardwired components 401. The programmable circuits 402 provide the black boxes' functionalities and thus replace the original hardwired components 401 via the interfaces of the black boxes 405 (including the connections to the data path 401). Additional inputs and outputs arising from the replacement may be visible to a developer or third party software.

The program according to which the controller 406 programs a programmable circuit 402 to replace a hardware circuit component 401 may be part of a SOTA/FOTA update. For example, the controller 406 receives program code for programming a programmable circuit 402 and the instruction to do so from an update controlling entity as part of a SOTA/FOTA update. Thus, the decision about a replacement of a hardware component 401 by means of a programmable circuit 402 may also be taken by a network-side controller (e.g. edge server 303) and be communicated (e.g. in form of an instruction) to the controller 406 of the processing system 400.

According to various examples, for a SOTA/FOTA update of the processing system 400, the controller 406 of the processing system may observe the environment (e.g. SINR, shadowing, etc.), determine a most suitable programmable circuit 402 for a certain hardware block 401 and related parameterization and apply the configuration to the determined programmable circuit 402.

The processing system 400 may for example be (or include) a communication device and the hardware components may be TX/RX building blocks.

In the following, some examples applicable specifically to the processing system 400 being (or including) an OBU are given (similar examples are applicable for other ECUs or communication devices).

In a high SINR environment, a precise Analog-to-Digital Conversion (ADC) may make sense. In a low SINR environments, on the other hand, a high precision is of limited value since the digitized values are highly corrupted by noise. According to one example, the controller 406 configures ADC precision of an ADC conversion component depending on observed environmental data, e.g. high ADC precision for High SINR, low ADC precision for low SINR.

Regarding channel coding, depending on the corresponding data base entries which encapsulate environmental/link quality conditions, the controller 406 of the processing system 400 may (e.g. in response to an instruction from the network side adjust a decoding algorithm implemented by the processing system (e.g., hard decision decoding for high SINR, soft decision decoding for low SINR), adapt metric sizes depending on the environment (at very low SINR, highly precise metrics may not make sense because the values are highly erroneous) used by the processing system 400, etc.

Regarding MIMO decoding, depending on the collected environmental data, the controller 406 can adjust the decoding algorithm used by the processing system 400, e.g. sphere decoding base Maximum Likelihood decoding if the SINR is low to medium, simply apply MMSE or Zero Forcing decoding if SINR is very high or, alternatively, perform sphere decoding with a smaller search space.

Performing an adjustment of the operation of the processing system 400 like the above may include replacing a hardware component 401 by a programmable software component 402 which is programmed in accordance with the adjusted operation or reprogramming a software component 402 in accordance with the adjustment in case it already has replaced a corresponding hardware component 401.

Figure 5:
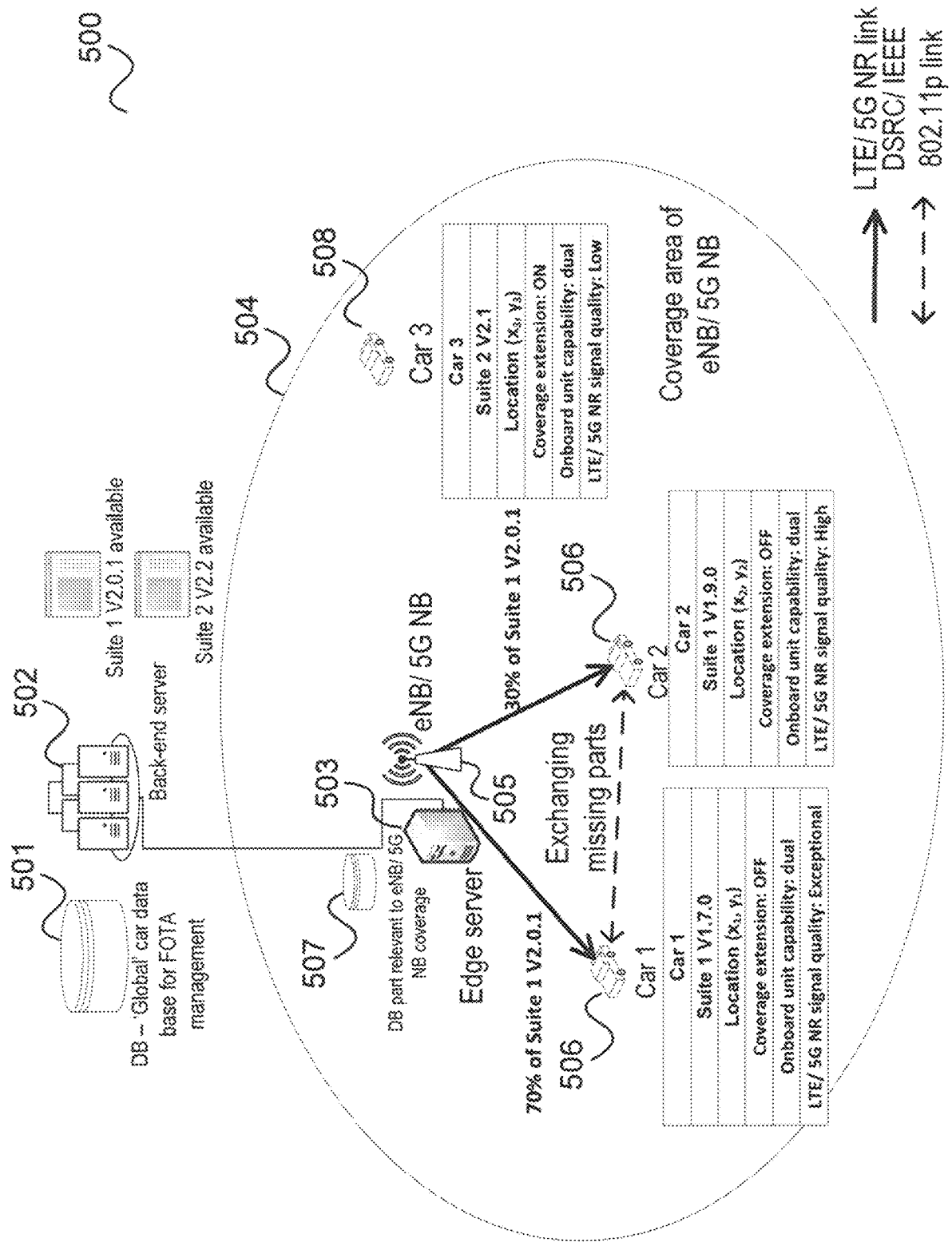
FIG. 5 shows a communication arrangement illustrating an example for updating vehicle components based on clustering of vehicles.

According to various examples, edge server 303 may perform a grouping of vehicles based on data base entries relevant to link quality, location, device (e.g. OBU) capabilities and the mutual need to obtain an upgraded version/release of the same software/firmware suite as it is illustrated in FIG. 5.

FIG. 5 shows a communication arrangement 500 illustrating an example for updating vehicle components based on clustering jointly based on location, software/firmware package version, device (e.g. OBU) capabilities & link quality criteria.

Similarly to FIG. 4, the communication arrangement 500 comprises a data base 501, a back-end server 502 connected to an edge server 503, wherein the edge server 503 is associated to (i.e. serves) a coverage area 504 operated by a base station 505 in which a plurality of vehicles 506, 508 are located. The edge server 503 maintains a local data base 507.

According to the present example, focusing on dense vehicular traffic conditions (e.g., at a city center, or, close to a toll/customs station, or service point), nearby located vehicles sharing the need to upgrade the same software/firmware suite can be grouped with the aim of best sharing an update load of mutual interest.

For example, according to the up-to-date database content of the local data base 507, the edge server 503 can determine that first vehicles 506 are closely located such that they can establish a short range connection and that they are under adequate LTE/NR coverage and share the same updating needs. Therefore, the edge server 503 clusters (i.e. groups) the first vehicles 506. On the other hand, third vehicle 508 is at the cell edge and moving out of the eNB/5G NB's (extended) coverage area. Further the coverage extension feature is for example "ON" for the third vehicle 508 meaning that an attempted update is quite unlikely to be successfully completed. Therefore, the edge server 503 decides to postpone the SOTA/FOTA update for the third vehicle 508.

In other words, the first vehicles 506 can be clustered in order for the commonly needed SOTA/FOTA update to be performed, whereas the third vehicle 508 cannot be part of the same cluster because it is characterized by different updating needs.

Regarding the device capabilities (of the device to be updated) the device of at least one of the vehicles of a given cluster should support both cellular (3GPP-based C-V2X) and short range communication (DSRC, IEEE 802.11p) interfaces, in order to be able to share parts of the downloaded SOTA/FOTA update file with other cluster members in its vicinity. The device may either be configured itself for this radio communication or have access to another device supporting this radio communication.

With respect to link quality-relevant data available at the data base 501 which is stored and maintained at the back-end server 502, or the data base 507 stored and maintained at the edge server 503 co-located with the radio node (base station) 505 providing LTE/5G NR connectivity, different chunks of the update file can be downloaded by different (C-V2X-capable) cluster members: larger clunks by vehicles operating at high SINR regimes and smaller chunks (or, chunks transmitted by means of a more sophisticated Modulation and Coding Scheme (MCS)) by vehicles experiencing frequent signal degradations in the downlink.

Once the different software/firmware update package parts allocated to the various C-V2X-capable cluster members are downloaded, side-link based communication can take place, in a way, such that, after a time interval is completed, all cluster members to complete their file update downloads.

Thus, unlike distributing SOTA/FOTA updates to vehicles regardless of the anticipated software/firmware package release, a vehicle clustering principle may be used which is not only location- and link quality dependent, but also driven by common update needs.

Figure 6:
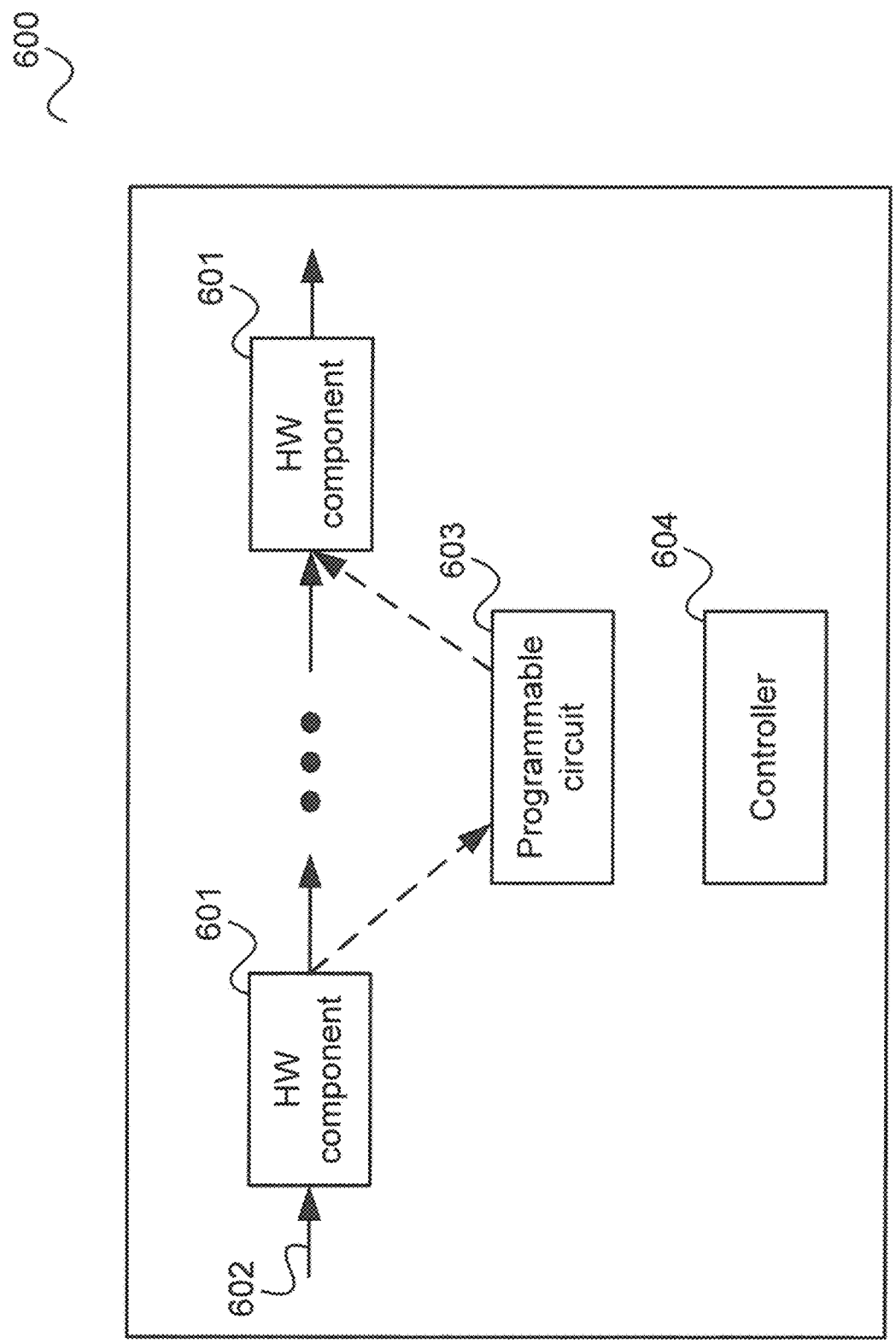
FIG. 6 shows a processing system according to various examples.

In summary, according to various examples, a processing system is provided as illustrated in FIG. 6.

FIG. 6 shows a processing system 600 according to various examples.

The processing system 600 comprises a plurality of hardware circuit components 601, each hardware circuit component 601 configured to provide a processing functionality.

Further, the processing system 600 comprises a data path 602 leading through the plurality of hardware circuit components 601.

The processing system 600 further comprises at least one programmable circuit 603 and a controller 604 configured to select one of the hardware circuit components 601 to be replaced by the at least one programmable circuit 603, to program the programmable circuit 603 to provide the processing functionality provided by the selected hardware circuit component 601 and to configure the data path to lead through the programmable circuit 603 instead of the selected hardware circuit component 601.

According to various examples, in other words, a hardware component may be physically replaced by a software (i.e. programmable) one. For example, an update of the processing system may comprise taking out an outdated hardware component out of the device's data path (which may be a control path or a communication path, e.g. a transmission path) and replace it by a programmable circuit which is programmed accordingly. The controller may initiate such a replacement based on one or more locally applicable metrics or key performance identifiers (KPIs).

The processing functionality may for example be an analog-to-digital conversion, a decoding, any kind of calculation or control algorithm, a quantization etc.

The (at least one) programmable circuit is for example an FPGA. It may also be realized by any other programmable component, e.g. a (micro)-processor or a programmable microcontroller. A memory may be provided to store the program instructions (i.e. the program code) for the programmable circuit.

The processing system may include a processing device comprising the hardware circuit components and the (at least one) programmable circuit. The controller may or may not be part of the processing device and the controller and other elements (e.g. devices) of the processing system, such as a receiver or a transmitter may be distributed and connected by means of communication connections (e.g. a communication network). For example, the processing system and its elements are installed in a vehicle and are connected by a vehicle communication network such as a CAN (Controller Area Network) Bus. The processing device may in this case be accessed (e.g. managed or controlled) by a control device (such as an ECU) or a communication device (such as a communication terminal providing radio communication for the vehicle).

The controller may perform its operations as described with reference to FIG. 6 in response to instructions from a server.

Figure 7:
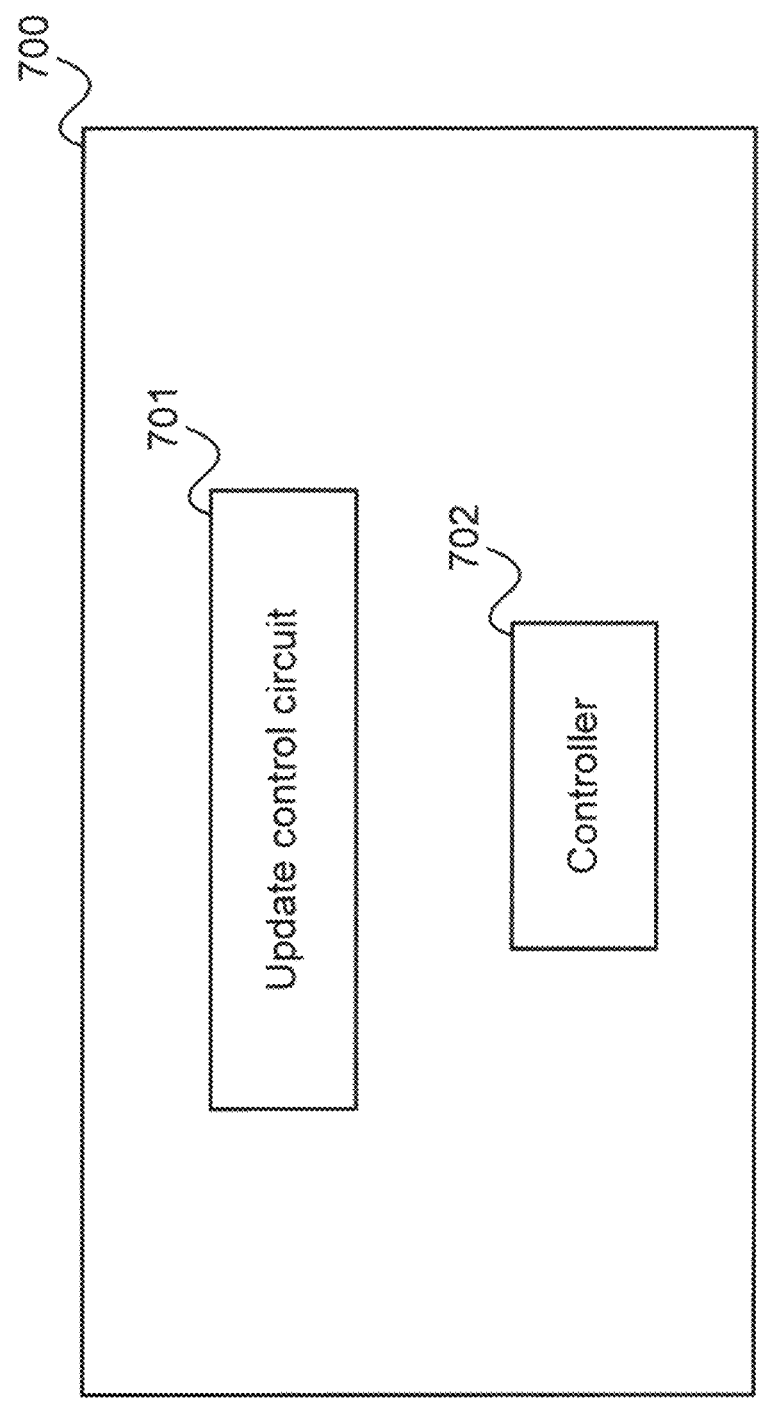
FIG. 7 shows an update server according to various examples.

FIG. 7 shows an update server 700 according to various examples.

The update server 700 comprises an update control circuit 701 configured to select a hardware circuit component of a plurality of hardware circuit components of a processing system, each hardware circuit component configured to provide a processing functionality.

The update server 700 further comprises a signaling circuit 702 configured to instruct the processing system to program a programmable circuit to provide the processing functionality provided by the selected hardware circuit component and instruct the processing system to configure a data path to lead through the programmable circuit instead of the selected hardware circuit component.

The update server 700 may for example instruct the processing system by means of radio communication (i.e. a radio link). The processing system may itself be capable of radio communication or may be connected to a communication device by means of which it may communicate with (i.e. receive instructions from) the update server.

Figure 8:
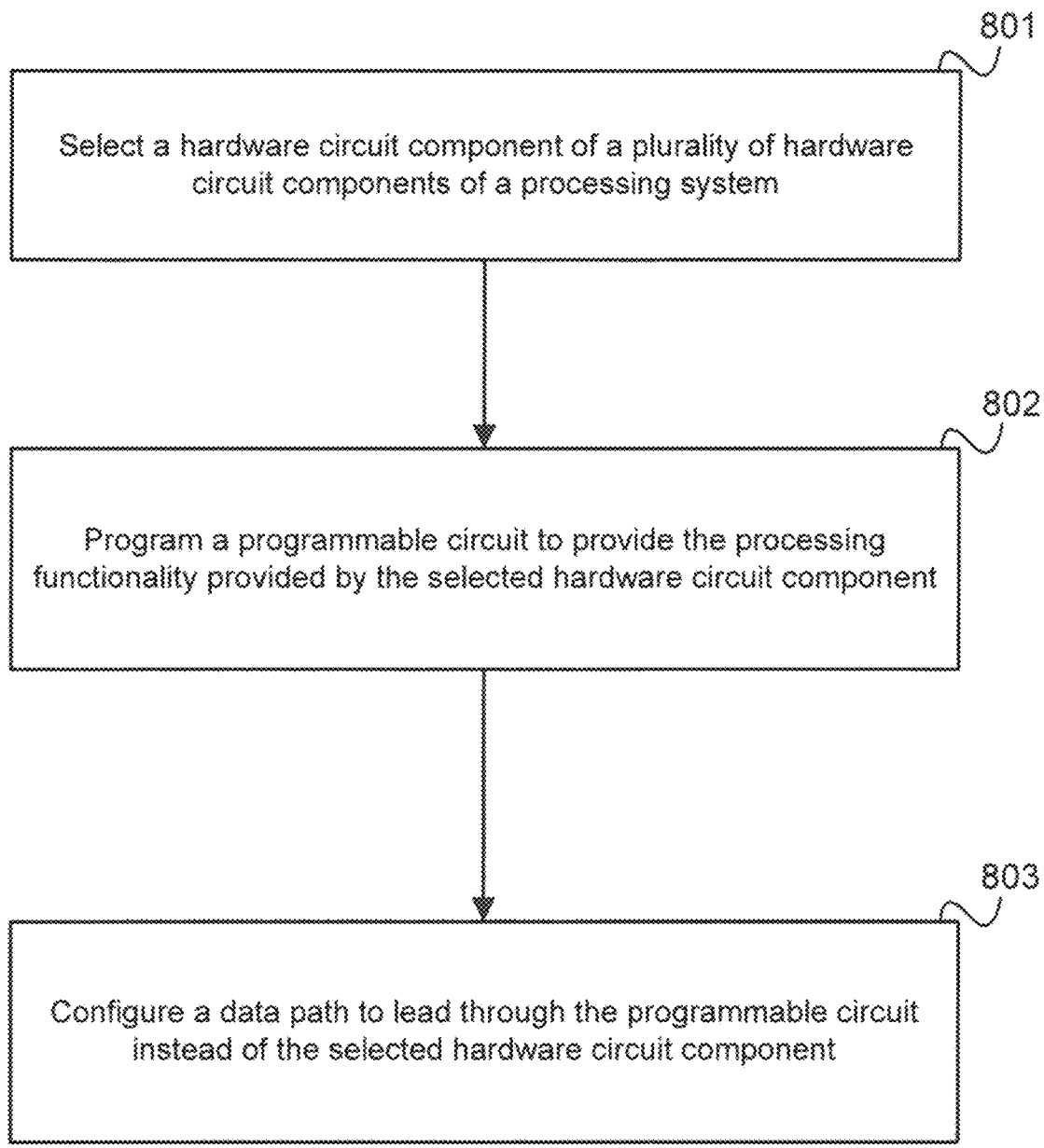
FIG. 8 shows a flow diagram illustrating a method for updating a processing system.

According to various examples a method as illustrated in FIG. 8 is performed, for example by a controller (on the side of the processing system or on the server side).

FIG. 8 shows a flow diagram 800 illustrating a method for updating a processing system, for example performed by a controller (on the side of the processing system or on the server side).

In 801, the controller selects a hardware circuit component of a plurality of hardware circuit components of a processing system, each hardware circuit component configured to provide a processing functionality.

In 802, the controller programs a programmable circuit to provide the processing functionality provided by the selected hardware circuit component.

In 803, the controller configures a data path to lead through the programmable circuit instead of the selected hardware circuit component.

According to various examples, instead of replacing the entire firmware of a processing system, such as a communication device or control unit, only specific components optimized for specific conditions or replaced or adjusted. This means that instead of updating an outdated software package to a single latest version and for all circumstances individual components (i.e. programmable circuits) may be updated individually depending on the circumstances such as location, time, used frequency band, radio link quality, clustering, radio coverage etc.

Specifically in automotive applications, it is typically required that availability & reliability are maximized for safety & life protection (while for a smartphone, call drops are annoying but no life-risking). Accordingly, instead of a single, "one fits all" firmware, as it may be used for a smartphone optimized and tailored firmware subcomponents which are optimized for a given geographical area, time period and circumstances (e.g. natural disasters) are provided to the processing system according to various examples. This may help improving safety of life.

According to the approach of FIGS. 6 to 8 hardware components can be temporarily replaced by software counterparts, exploiting dedicated reconfigurable hardware resources, such as FPGAs. This can be seen to be in contrast to having fixed allocation of functionalities to software and hardware components (and only updating or adjusting the software of the programmable circuits).

According to various examples, instead of real-time download of software for the programmable circuits, the software can be identified ahead of time for a specific geographical area, time period, function criticality etc. Since the software is obtained a priori, the focused functionalities can be made independent of fluctuations in coverage or signal quality.

Relevant metrics based on which the controller or server may decide whether to update a programmable circuit or whether to replace a hardware component or what version of a software or update to use for a programmable circuit may include one or more of the following:

- Link metrics, e.g. latency, PER (Packet Error rate), QoS (Quality of Service) in terms of throughput and/or outages;
- Urgency or criticality of the situation, e.g. normal situation vs. life threatening conditions;
- Context-dependent (environmental) conditions, e.g., normal vs. poor weather conditions, seasonal conditions, extraordinary occasions such as natural disasters, increased traffic conditions etc.

The controller, components of a communication device or control device the processing system may be part of and the components of the update server may for example be implemented by one or more processors. A "processor" may be understood as any kind of a logic implementing entity, which may be special purpose circuitry or a processor executing software stored in a memory, firmware, or any combination thereof. Thus a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor". The communication device may for example be at least partially implemented by a transceiver which may for example be at least partially implemented by a modem (e.g. an LTE modem), a baseband processor or other transceiver components or also by an application processor. The communication device may for example be a communication terminal as such and may comprise typical communication terminal devices such as a transceiver (comprising e.g. a baseband processor, one or more filters, transmit chains, receive chains, amplifiers etc.), an antenna, a subscriber identity module, an application processor, a memory etc.

The following examples pertain to further exemplary implementations.

Example 1 is a processing system as illustrated in FIG. 6.

In Example 2, the processing system according to Example 1 may optionally include the processing system comprising a processing device comprising the hardware circuit components and the at least one programmable circuit and being configured to operate as a communication device wherein each hardware circuit component is configured or at least some of the hardware circuit components are configured to provide a communication functionality.

In Example 3, the processing system according to Example 1 or 2 may optionally include the processing system comprising a processing device comprising the hardware circuit components and the at least one programmable circuit and being configured to operate as a control device configured to control operation of a vehicle and wherein each hardware circuit component is configured or at least some of the hardware circuit components are configured to provide a control processing functionality.

In Example 4, the processing system according to any one of Examples 1-3 may optionally include a communication subsystem comprising the plurality of hardware circuit components and the programmable circuit, wherein the data path connects an input and an output of the communication subsystem.

In Example 5, the processing system according to any one of Examples 1-4 may optionally include a receiver configured to receive an instruction for replacement of a hardware circuit component, wherein the controller is configured to select one of the hardware circuit components to be replaced by the programmable circuit according to the instruction, program the programmable circuit to provide the processing functionality provided by the selected hardware circuit component according to the instruction and configure the data path to lead through the programmable circuit instead of the selected hardware circuit component according to the instruction.

In Example 6, the processing system according to Example 5 may optionally include the receiver being configured to receive the instruction from a server computer.

In Example 7, the processing system according to any one of Examples 1-6 may optionally include the controller being configured to detect whether a predetermined initiation criterion is fulfilled and, when the predetermined initiation criterion is fulfilled, select the one of the hardware circuit components to be replaced by the programmable circuit, program the programmable circuit to provide the processing functionality provided by the selected hardware circuit component and configure the data path to lead through the programmable circuit instead of the selected hardware circuit component.

In Example 8, the processing system according to Example 7 may optionally include a positioning circuit configured to determine a geographical location of the processing system, wherein the predetermined criterion is that the processing system is located in a predetermined geographical area.

In Example 9, the processing system according to Example 7 or 8 may optionally include a clock configured to determine a time, wherein the predetermined criterion is that it is a certain time.

In Example 10, the processing system according to any one of Examples 7-9 may optionally include the predetermined criterion being that the processing system is to communicate in a certain frequency band.

In Example 11, the processing system according to any one of Examples 1-10 may optionally include a positioning circuit configured to determine a geographical location of the processing system, wherein the controller is configured to select a version of the processing functionality according to which it programs the programmable circuit to provide the processing functionality provided by the selected hardware circuit component based on the geographical location.

In Example 12, the processing system according to Example 11 may optionally include a receiver configured to receive an indication of the version of the processing functionality.

In Example 13, the processing system according to Example 12 may optionally include the version of the processing functionality being a software version according to which the controller programs the programmable circuit to provide the processing functionality provided by the selected hardware circuit component.

In Example 14, the processing system according to any one of Examples 1-13 may optionally include a receiver configured to receive programming code and the controller being configured to program the programmable circuit by means of the programming code to provide the processing functionality provided by the selected hardware circuit component.

In Example 15, the processing system according to Example 14 may optionally include the processing system being installed in a vehicle and comprising a transmitter configured to transmit the programming code at least partially to at least one other vehicle.

In Example 16, the processing system according to Example 14 or 15 may optionally include the processing system being installed in a vehicle and the receiver being configured to receive the programming code from a network side server or another vehicle.

In Example 17, the processing system according to any one of Examples 1-16 may optionally include the processing functionality being a modem functionality.

In Example 18, the processing system according to any one of Examples 1-17 may optionally include the processing functionality being a mobile communication functionality.

In Example 19, the processing system according to any one of Examples 1-18 may optionally include the processing functionality being a vehicle to everything communication functionality.

In Example 20, the processing system according to any one of Examples 1-19 may optionally include the controller being configured to program the programmable circuit to provide an extended processing functionality with respect to the processing functionality provided by the selected hardware circuit component.

In Example 21, the processing system according to any one of Examples 1-20 may optionally include the controller being configured to detect whether a predetermined return criterion is fulfilled and, when the predetermined return criterion is fulfilled, configure the data path back to lead through the selected hardware circuit component instead of the programmable circuit.

In Example 22, the processing system according to Example 21 may optionally include the return criterion being that the processing system is no longer located in a predetermined geographical area or that it is a certain time.

Example 23 is an update server as illustrated in FIG. 7.

In Example 24, the update server of Example 23 may optionally include the update control circuit being configured to detect whether a predetermined initiation criterion is fulfilled and, when the predetermined initiation criterion is fulfilled, select the hardware circuit component of the plurality of hardware circuit components of a processing system and control the signaling circuit to instruct the processing system to program the programmable circuit to provide the processing functionality provided by the selected hardware circuit component and to instruct the processing system to configure the data path to lead through the programmable circuit instead of the selected hardware circuit component.

In Example 25, the update server of Example 24 may optionally include the predetermined criterion being that the processing system is located in a predetermined geographical area, wherein the predetermined criterion is that it is a certain time or wherein the predetermined criterion is that the processing system is to communicate in a certain frequency band.

In Example 26, the update server according to any one of Example 23-25 may optionally include the update control circuit being configured to determine a geographical location of the processing system and to select a version of the processing functionality based on the geographical location and wherein the signaling circuit is configured to instruct the processing system to program the programmable circuit according to the selected version.

In Example 27, the update server according to Example 26 may optionally include the version of the processing functionality being a software version.

In Example 28, the update server according to any one of Examples 23-27 may optionally include the signaling circuit being configured to transmit programming code to the processing system and to instruct the processing system to program the programmable circuit by means of the programming code to provide the processing functionality provided by the selected hardware circuit component.

In Example 29, the update server according to Example 28 may optionally include the processing system being installed in a vehicle and the signaling circuit being configured to instruct the processing system to transmit the programming code at least partially to at least one other vehicle.

In Example 30, the update server according to any one of Examples 23-29 may optionally include the processing functionality being a modem functionality.

In Example 31, the update server according to any one of Examples 23-30 may optionally include the processing functionality being a mobile communication functionality.

In Example 32, the update server according to any one of Examples 23-31 may optionally include the processing functionality being a vehicle to everything communication functionality.

In Example 33, the update server according to any one of Example 23-32 may optionally include the signaling circuit being configured to instruct the processing system to program the programmable circuit to provide an extended processing functionality with respect to the processing functionality provided by the selected hardware circuit component.

In Example 34, the update server according to any one of Examples 23-33 may optionally include the update control circuit being configured to detect whether a predetermined return criterion is fulfilled and the signaling circuit being configured to, when the predetermined return criterion is fulfilled, instruct the processing system to configure the data path back to lead through the selected hardware circuit component instead of the programmable circuit.

In Example 35, the update server according to Example 34 may optionally include the return criterion being that the processing system is no longer located in a predetermined geographical area or that it is a certain time.

Example 36 is a method for updating a processing system as illustrated in FIG. 8.

In Example 37, the method according to Example 36 may optionally include detecting whether a predetermined initiation criterion is fulfilled and, when the predetermined initiation criterion is fulfilled, selecting the one of the hardware circuit components to be replaced by the programmable circuit, programming the programmable circuit to provide the processing functionality provided by the selected hardware circuit component and configuring the data path to lead through the programmable circuit instead of the selected hardware circuit component.

In Example 38, the method of Example 37 may optionally include the predetermined criterion being that the processing system is located in a predetermined geographical area, wherein the predetermined criterion is that it is a certain time or wherein the predetermined criterion is that the processing system is to communicate in a certain frequency band.

In Example 39, the method according to any one of Examples 36-38 may optionally include the processing system comprising a processing device comprising the hardware circuit components and the at least one programmable circuit and operates as a communication device wherein each hardware circuit component or at least some of the hardware circuit components provide a communication functionality.

In Example 40, the method according to any one of Examples 36-39 may optionally include the processing system comprising a processing device comprising the hardware circuit components and the at least one programmable circuit and operates as a control device to control operation of a vehicle and each hardware circuit component or at least some of the hardware circuit components provide a control processing functionality.

In Example 41, the method according to any one of Examples 36-40 may optionally include a communication subsystem comprising the plurality of hardware circuit components and the programmable circuit, wherein the data path connects an input and an output of the communication subsystem.

In Example 42, the method according to any one of Examples 36-41 may optionally include receiving an instruction for replacement of a hardware circuit component and selecting one of the hardware circuit components to be replaced by the programmable circuit according to the instruction, programming the programmable circuit to provide the processing functionality provided by the selected hardware circuit component according to the instruction and configuring the data path to lead through the programmable circuit instead of the selected hardware circuit component according to the instruction.

In Example 43, the method according to Example 42 may optionally include receiving the instruction from a server computer.

In Example 44, the method according to any one of Examples 36-43 may optionally include determining a geographical location of the processing system and selecting a version of the processing functionality according to which it programs the programmable circuit to provide the processing functionality provided by the selected hardware circuit component based on the geographical location.

In Example 45, the method according to Example 44 may optionally include receiving an indication of the version of the processing functionality.

In Example 46, the method according to Example 45 may optionally include the version of the processing functionality being a software version according to which the programmable circuit is programmed to provide the processing functionality provided by the selected hardware circuit component.

In Example 47, the method according to any one of Examples 36-46 may optionally include receiving programming code and programming the programmable circuit by means of the programming code to provide the processing functionality provided by the selected hardware circuit component.

In Example 48, the method according to Example 47 may optionally include the processing system being installed in a vehicle and the method comprising transmitting the programming code at least partially from the processing system to at least one other vehicle.

In Example 49, the method according to Example 47 or 48 may optionally include the processing system being installed in a vehicle and the method comprising receiving the programming code from a network side server or another vehicle.

In Example 50, the method according to any one of Examples 36-49 may optionally include the processing functionality being a modem functionality.

In Example 51, the method according to any one of Examples 36-50 may optionally include the processing functionality being a mobile communication functionality.

In Example 52, the method according to any one of Examples 36-51 may optionally include the processing functionality being a vehicle to everything communication functionality.

In Example 53, the method according to any one of Examples 36-52 may optionally include programming the programmable circuit to provide an extended processing functionality with respect to the processing functionality provided by the selected hardware circuit component.

In Example 54, the method according to any one of Examples 36-53 may optionally include detecting whether a predetermined return criterion is fulfilled and, when the predetermined return criterion is fulfilled, configuring the data path back to lead through the selected hardware circuit component instead of the programmable circuit.

In Example 55, the method according to Example 54 may optionally include the return criterion being that the processing system is no longer located in a predetermined geographical area or that it is a certain time.

According to a further example, a processing system is provided comprising a receiver configured to receive an update instruction an update data from an update server and comprising an update control circuit configured to, in response of the update instruction, program a programmable circuit based on the update data and replace a hardware component by the programmable circuit.

It should be noted that one or more of the features of any of the examples above may be combined with any one of the other examples.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

What is claimed is:

1. A processing system comprising:
    a plurality of hardware circuit components, each hardware circuit component being a hardwired component configured to provide a processing functionality;
    a data path leading through the plurality of hardware circuit components;
    at least one programmable circuit;
    a controller configured to
        select one of the hardware circuit components to be replaced by the at least one programmable circuit;
        program the programmable circuit to provide the processing functionality provided by the selected hardware circuit component; and
        configure the data path to lead through the programmable circuit instead of the selected hardware circuit component.

2. The processing system according to claim 1, wherein the processing system comprises a processing device comprising the hardware circuit components and the at least one programmable circuit and configured to operate as a communication device wherein each hardware circuit component is configured or at least some of the hardware circuit components are configured to provide a communication functionality.

3. The processing system according to claim 1, wherein the processing system comprises a processing device comprising the hardware circuit components and the at least one programmable circuit and configured to operate as a control device configured to control operation of a vehicle and wherein each hardware circuit component is configured or at least some of the hardware circuit components are configured to provide a control processing functionality.

4. The processing system according to claim 1, comprising a communication subsystem comprising the plurality of hardware circuit components and the programmable circuit, wherein the data path connects an input and an output of the communication subsystem.

5. The processing system according to claim 1, comprising a receiver configured to receive an instruction for replacement of a hardware circuit component, wherein the controller is configured to select one of the hardware circuit components to be replaced by the programmable circuit according to the instruction, program the programmable circuit to provide the processing functionality provided by the selected hardware circuit component according to the instruction and configure the data path to lead through the programmable circuit instead of the selected hardware circuit component according to the instruction.

6. The processing system according to claim 5, wherein the receiver is configured to receive the instruction from a server computer.

7. The processing system according to claim 1, wherein the controller is configured to detect whether a predetermined initiation criterion is fulfilled and, when the predetermined initiation criterion is fulfilled, select the one of the hardware circuit components to be replaced by the programmable circuit, program the programmable circuit to provide the processing functionality provided by the selected hardware circuit component and configure the data path to lead through the programmable circuit instead of the selected hardware circuit component.

8. The processing system according to claim 7, comprising a positioning circuit configured to determine a geographical location of the processing system, wherein the predetermined criterion is that the processing system is located in a predetermined geographical area.

9. The processing system according to claim 7, comprising a clock configured to determine a time, wherein the predetermined criterion is that it is a certain time.

10. The processing system according to claim 7, wherein the predetermined criterion is that the processing system is to communicate in a certain frequency band.

11. The processing system according to claim 1, comprising a positioning circuit configured to determine a geographical location of the processing system, wherein the controller is configured to select a version of the processing functionality according to which it programs the programmable circuit to provide the processing functionality provided by the selected hardware circuit component based on the geographical location.

12. The processing system according to claim 11, comprising a receiver configured to receive an indication of the version of the processing functionality.

13. The processing system according to claim 12, wherein the version of the processing functionality is a software version according to which the controller programs the programmable circuit to provide the processing functionality provided by the selected hardware circuit component.

14. The processing system according to claim 1, comprising a receiver configured to receive programming code and the controller is configured to program the programmable circuit by means of the programming code to provide the processing functionality provided by the selected hardware circuit component.

15. An update server comprising
an update control circuit configured to select a hardware circuit component of a plurality of hardware circuit components of a processing system, each hardware circuit being a hardwired component configured to provide a processing functionality;
a signaling circuit configured to
instruct the processing system to program a programmable circuit to provide the processing functionality provided by the selected hardware circuit component; instruct the processing system to configure a data path to lead through the programmable circuit instead of the selected hardware circuit component.

16. The update server of claim 15, wherein the update control circuit is configured to detect whether a predetermined initiation criterion is fulfilled and, when the predetermined initiation criterion is fulfilled, select the hardware circuit component of the plurality of hardware circuit components of a processing system and control the signaling circuit to instruct the processing system to program the programmable circuit to provide the processing functionality provided by the selected hardware circuit component and to instruct the processing system to configure the data path to lead through the programmable circuit instead of the selected hardware circuit component.

17. The update server of claim 16, wherein the predetermined criterion is that the processing system is located in a predetermined geographical area, wherein the predetermined criterion is that it is a certain time or wherein the predetermined criterion is that the processing system is to communicate in a certain frequency band.

18. A method for updating a processing system comprising
selecting a hardware circuit component of a plurality of hardware circuit components of a processing system, each hardware circuit component configured to provide a processing functionality;
programming a programmable circuit to provide the processing functionality provided by the selected hardware circuit component; and
configuring a data path to lead through the programmable circuit instead of the selected hardware circuit component.

19. The method according to claim 18, comprising detecting whether a predetermined initiation criterion is fulfilled and, when the predetermined initiation criterion is fulfilled, selecting the one of the hardware circuit components to be replaced by the programmable circuit, programming the programmable circuit to provide the processing functionality provided by the selected hardware circuit component and configuring the data path to lead through the programmable circuit instead of the selected hardware circuit component.

20. The method of claim 19, wherein the predetermined criterion is that the processing system is located in a predetermined geographical area, wherein the predetermined criterion is that it is a certain time or wherein the predetermined criterion is that the processing system is to communicate in a certain frequency band.

* * * * *